United States Patent

Kawada

[15] 3,683,210

[45] Aug. 8, 1972

[54] HIGH VOLTAGE GENERATING APPARATUS UTILIZING PIEZOELECTRIC TRANSFORMERS

[72] Inventor: Takehiko Kawada, Yokohama, Japan

[73] Assignee: Denki Onkyo Co. Ltd.

[22] Filed: April 13, 1970

[21] Appl. No.: 27,856

[52] U.S. Cl. ......................310/8.1, 310/9.5, 310/9.8

[51] Int. Cl. ..............................................H01v 7/00

[58] Field of Search.............310/8, 8.1, 9.7, 9.8, 8.2; 333/72; 331/73, 116, 155, 158, 163

[56] References Cited

UNITED STATES PATENTS

| | | | |
|---|---|---|---|
| 3,562,792 | 2/1971 | Berlincourt et al. | 310/8.1 |
| 2,410,389 | 10/1946 | Norrman | 331/73 X |
| 2,455,824 | 12/1948 | Teller et al. | 331/73 |
| 2,975,354 | 3/1961 | Rosen | 310/8.1 X |
| 3,026,488 | 3/1962 | Lister et al. | 331/73 X |
| 3,256,498 | 6/1966 | Hurtig | 331/116 X |
| 3,487,239 | 12/1969 | Schafft | 310/8 X |

*Primary Examiner*—J. D. Miller
*Assistant Examiner*—Mark O. Budd
*Attorney*—Chittick, Pfund, Birch, Samuels & Gauthier

[57] ABSTRACT

In a high voltage generating apparatus utilizing a piezoelectric transformer having two driving electrodes and an output electrode, a signal of a definite frequency is applied across the driving electrodes via an inductance element, a capacitor is connected in parallel with the driving electrodes to form a resonance circuit together with the inductance element and the resonance frequency of the resonance circuit is made substantially equal to the natural resonance frequency of the piezoelectric transformer which is equal to an odd higher harmonic of the signal frequency.

3 Claims, 7 Drawing Figures

TAKEHIKO KAWADA INVENTOR

BY Chittick, Pfund, Birch, Samuels & Gauthier
ATTORNEY

TAKEHIKO KAWADA *INVENTOR*

BY Chittick, Pfund, Birch, Samuels & Gauthier
ATTORNEY

HIGH VOLTAGE GENERATING APPARATUS UTILIZING PIEZOELECTRIC TRANSFORMERS

CROSS REFERENCE TO RELATED APPLICATION

This application is related to Ser. No. 27,857 filed Apr. 13, 1970.

BACKGROUND OF THE INVENTION

This invention relates to a high voltage generating apparatus utilizing a piezoelectric transformer and more particularly to a high voltage generating apparatus utilizing a piezoelectric transformer especially suitable for accelerating an electron beam to a high speed to impinge upon a fluorescent screen of a television receiving tube.

Different from the conventional piezoelectric element of ceramics of the titanate, zirconate and lead type (designated as PZT) which is driven by a mechanical impulse applied directly thereto, the piezoelectric transformer used herein comprises a substrate of the above described ceramics, two driving electrodes on the opposite surfaces of one end of the substrate and an output electrode on the opposite end wherein an AC signal is applied across the driving electrodes to cause the substrate to resonate at its natural frequency whereby to derive a high voltage out of the output electrode.

Such a piezoelectric transformer has been connected in circuit with a horizontal deflection circuit of a television receiver to act as a load, and a pulse voltage generated by a switching element comprising a portion of the horizontal deflection circuit is applied across the driving electrodes of the piezoelectric transformer during the blanking period of the horizontal deflection beam. Although the switching element is utilized to pass the deflection current through the deflection coil, since the switching element is generally used to operate at a point near its limits of the breakdown voltage and permissible loss from the standpoint of economy a problem arises regarding how to withstand the back electromotive force generated during the blanking period of the deflection beam. Further, when the horizontal deflection circuit is loaded with such a piezoelectric transformer, the voltage impressed across the electrodes of the switching element tends to rise at the time of interruption of the element which is of course undesirable for the element. In addition, the capacitance between driving electrodes of the piezoelectric transformer varies dependently upon the frequency of the voltage impressed across its driving electrodes and apparently becomes zero when the frequency coincides with the resonance frequency of the piezoelectric transformer. Such variations in the capacitance directly varies the resonance frequency of a resonance circuit including the capacitance.

It is also desirable to take out various voltages from the piezoelectric transformer. For example, it is necessary to supply a high voltage to the anode electrode of the receiving tube and a medium voltage lower than said high voltage to the focusing electrode. When the voltage derived out from the output electrode of the piezoelectric transformer is divided to accomplish this object the voltage generated varies greatly as the high voltage current varies. Such a high voltage regulation not only causes the brightness to vary as well as the size of the received picture displayed on the face plate of the receiving tube, but also results in a soft focusing of the electron beam spot or distortion thereof. Although these problems may be obviated by providing a plurality of output electrodes, the internal impedance as viewed from the output side of the piezoelectric transformer, is very large and the provision of a plurality of electrodes varies the mechanical natural resonance frequency and greatly varies the output voltage.

SUMMARY OF THE INVENTION

It is therefore an object of this invention to provide a new and improved high voltage generating apparatus utilizing a piezoelectric transformer and operating very stably.

Another object of this invention is to improve the circuit arrangements on the input and output sides of a piezoelectric transformer so as not to affect the operating characteristics thereof.

A further object of this invention is to provide a series resonance circuit resonating to a frequency substantially equal to the natural resonance frequency of the piezoelectric transformer on the input side thereof whereby to provide a novel high voltage generating apparatus capable of driving the piezoelectric transformer at a high efficiency.

Still further object of this invention is to provide a reliable high voltage generating apparatus wherein the back electromotive force of a definite frequency which is created in the horizontal deflection circuit of a television receiver during the blanking period of the deflection beam and applied to a switching element is decreased by applying to the back electromotive force a voltage generated in the resonance circuit and having an odd higher harmonic of the frequency of the back electromotive force.

Yet another object of this invention is to provide an improved high voltage generating apparatus wherein a high voltage and a medium voltage are independently derived out from the piezoelectric transformer to stabilize respective output voltages. For this reason, variations in the brightness and size of the received picture displayed on the face plate of the receiving tube are greatly reduced. Further, the medium voltage is also stabilized thus reducing soft focusing and distortion of the electron beam spot whereby pictures of high qualifies can be reproduced.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
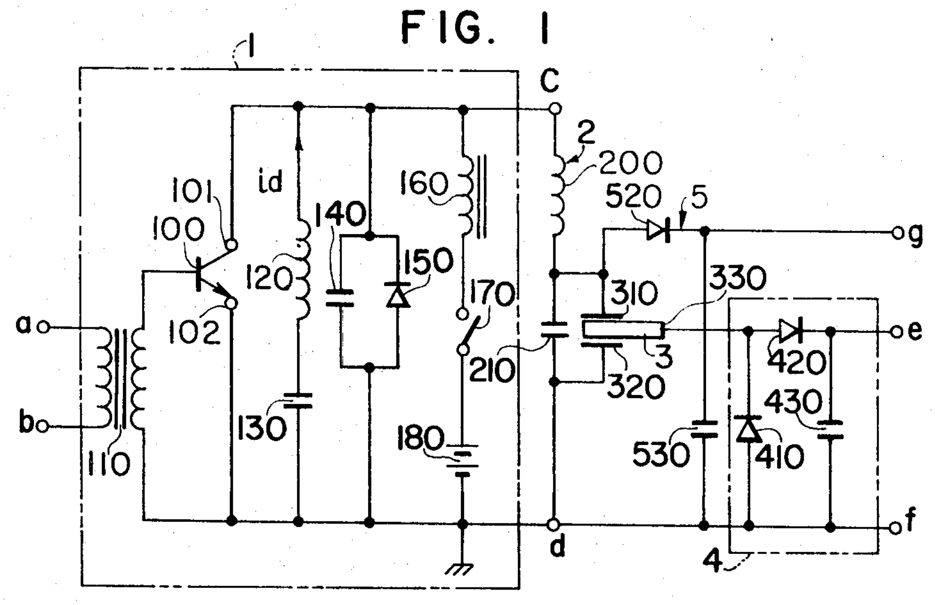
FIG. 1 shows a connection diagram of a horizontal deflection circuit of a television receiver incorporating the novel high voltage generating apparatus utilizing a piezoelectric transformer.

Referring now to FIG. 1 of the accompanying drawing there is shown a horizontal deflection circuit 1 for a television receiving circuit provided with input terminals a and b and output terminals c and d. Connected across output terminal *c* and *d* is a resonance circuit 2 comprised by serially connected inductance element or a coil 200 and a capacitor 210. A piezoelectric transformer 3 is connected in parallel with the capacitor 210. More particularly one driving electrode 310 of the piezoelectric transformer is connected to one terminal of coil 200 while the other driving electrode 320 is connected directly to the output terminal d. The output electrode 330 of the piezoelectric transformer 3 is connected to a rectifier circuit 4 which functions to step up and rectify the high voltage output. The output of the rectifier circuit is applied to the succeeding stage through terminals *e* and *f*.

In the horizontal deflection circuit 1 an input device 110 of a control signal controlling the operation of a switching element 100 comprised by a transistor for example is connected across input terminals *a* and *b*. A collector electrode 101 and an emitter electrode 102 of the switching element 100 are connected directly to output terminals *c* and *d*. Across collector and emitter electrodes 101 and 102 are also connected a series circuit including a horizontal deflection coil 120 and a capacitor 130 for shaping the waveform of the deflection current, a parallel circuit including a capacitor 140 for determining the blanking period and a damper diode 150, and a series circuit including a choke coil 160, a switch 170 and a source of current 180.

Values of coil 200 and capacitor 210 of the resonance circuit 2 are selected such that the resonance circuit 2 will resonate at an odd higher harmonic of the horizontal deflection frequency. In determing the circuit constants the capacitance between driving electrodes 310 and 320 is also taken into consideration. In the illustrated example, the third harmonic is employed.

The rectifier circuit 4 comprises a pair of diodes 410 and 420 and a capacitor 430, the output electrode 330 of the piezoelectric transformer 3 being connected to the juncture between diodes 410 and 420 to provide double voltage rectification.

Further, a diode 520 is connected to the driving electrode 310 of the piezoelectric transformer 3 and the juncture between diode 520 and an output terminal *g* of the horizontal deflection circuit 4 is connected to a smoothing capacitor 530, these elements comprising a medium voltage rectifier circuit 5.

Figure 4:
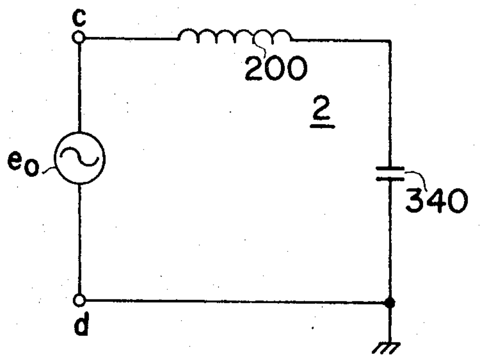
FIG. 4 shows an equivalent circuit of the resonance circuit as viewed from terminals *c* and *d* of FIG. 1.
Figure 2A:
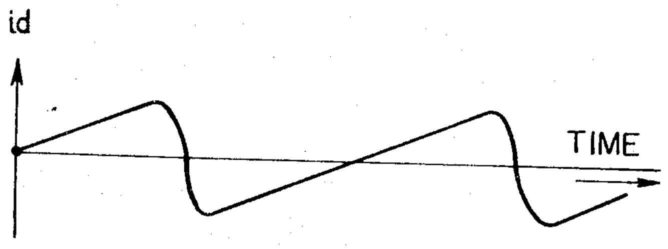
FIGS. 2A, 2B, and 2C show waveforms at various portions of the circuit shown in FIG. 1.
Figure 2B:
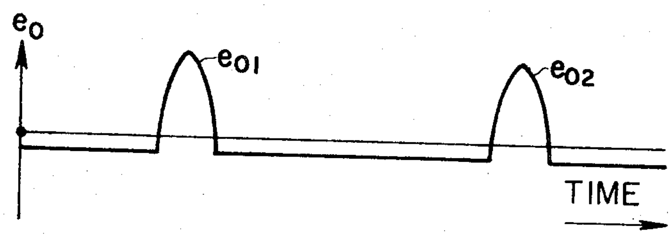
Figure 2C:
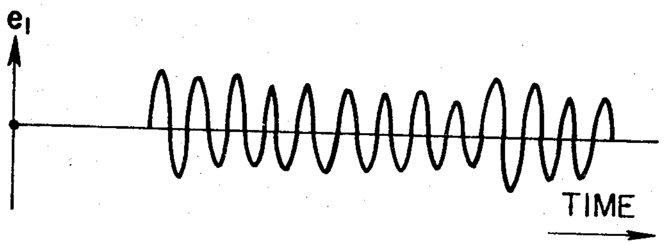

In operation, when switch 170 is closed and when an input signal is applied across input terminals *a* O2 *b* of the horizontal deflection circuit 4, the switching element 100 becomes ON and OFF. The deflection current id that flows through the horizontal deflection coil 120 under these conditions is shown by curve *a* in FIG. 2, and sine wave pulse voltages $e_{o1}$ and $e_{o2}$ as shown by curve *b* in FIG. 2 are induced between collector and emitter electrodes 101 and 102 of the switching element 100 during the blanking period of the deflection beam. These induced voltages $e_{o1}$ and $e_{o1}$ cause the resonance circuit 2 to resonate. FIG. 4 shows an equivalent circuit under these conditions. In FIG. 4, $e_o$ is the voltage source representing the voltage applied across terminals c and d from the horizontal deflection circuit and 340 represents a capacitance element having a capacitance equal to the sum of the apparent capacitance between driving electrodes 310 and 320 of the piezoelectric transformer 3 and that of capacitor 210. Thus when impressed across resonance circuit 2, the pulse voltage $e_o$ produces a higher harmonic $e_1$ having a frequency three times as large as that of the pulse voltage $e_o$, as shown by curve *c* in FIG. 2.

Figure 3A:
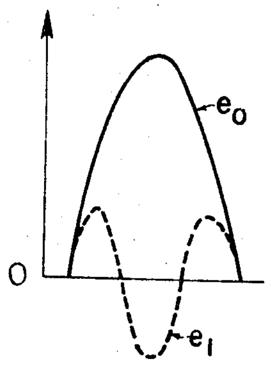
FIG. 3A shows a waveform to explain the manner of cancelling the back electromotive force created during the blanking period by a voltage generated by a resonance circuit according to the principle of this invention.
Figure 3B:
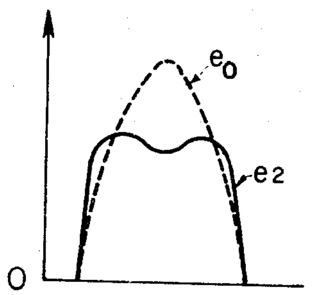
FIG.3B shows the resultant of the two waveforms shown in FIG.3A.

The relationship between the higher harmonic $e_1$ and pulse voltage $e_o$ is shown in FIG.3A. As shown, the higher harmonic $e_1$ induced by resonance circuit 2 has a frequency three times larger than that of the pulse voltage $e_o$, that is the frequency of the horizontal deflection circuit and since the higher harmonic $e_i$ is induced by the pulse voltage $e_0$, the negative half cycle of the harmonic $e_1$ has its maximum value near the maximum of the pulse voltage $e_o$ of the sine waveform. Consequently, a resultant voltage $e_2$ with a decreased positive value appears across output terminals *c* and *d* as shown in FIG. 3B, so that the breakdown voltage of switching element 100 may be reduced since the voltage $e_o$ impressed across the electrodes 101 and 102 thereof has decreased positive value.

On the other hand, since a self induced voltage appearing across the driving electrodes 310 and 320 of the piezoelectric transformer 3 is biased and shifted by the voltage supplied from the switching element 100 the maximum value becomes higher than that produced when the piezoelectric transformer is operated merely by the driving voltage supplied by the switching element 100 or by the self-induced voltage.

The result of my experiment made on a standard signal television receiver shows that a satisfactory result was obtained for a higher harmonic having a frequency nine times as large as the horizontal deflection frequency of 15075 KH2. In this case, it is preferable to use a piezoelectric transformer having a high conversion efficiency at a frequency of vibration of approximately 141 KH2. With these parameters it is possible to greatly reduce the dimension of the piezoelectric transformer than the conventional one prepared to resonate at the horizontal deflection frequency.

It is to be understood that the resonance frequency of the resonance circuit 2 is not limited to three times the horizontal deflection frequency and that any odd higher harmonics can be used.

As has been pointed out before when the resonance circuit 2 resonates, a voltage higher than that supplied from the horizontal deflection circuit 1 will be induced across driving electrodes 310 and 320 of the piezoelectric transformer 3, and this induced voltage is applied to the medium voltage rectifier circuit 5. The voltage appearing at the output terminal *g* of the rectifier circuit 5 is very stable because it is not derived out through the piezoelectric transformer 3. Moreover as the medium voltage is completely isolated from the high voltage derived out from the output electrode 330 of the piezoelectric transformer 3 via rectifier circuit 4, there is no fear of increasing the voltage regulation of the high voltage.

Although in the illustrated embodiment the horizontal deflection circuit is utilized to drive the piezoelectric transformer it will be clear that any independent source of pulse voltage can be used as the driving source.

It is appreciated that the invention is amenable to numerous other modifications, and it is of course desired to cover by the appended claims all such modifications as fall within the true spirit and scope of the invention.

What is claimed is:

1. High voltage generating apparatus comprising a piezoelectric transformer including two driving electrodes and an output electrode, an inductance element with one end connected to one of the driving electrodes, a source of impulse signal connected across the other end of said inductance element and the other of said driving electrodes to supply said impulse signal of a given frequency, and a capacitor connected across said driving electrodes, said inductance element and said capacitor constituting a resonance circuit having a resonance frequency substantially equal to the natural resonance frequency of said piezoelectric element and equal to an odd higher harmonic of the frequency of said signal source, said odd higher harmonic combining to reduce the peak voltage of said impulse signal.

2. The high voltage generating apparatus according to claim 1 in which said source includes a switching element comprising the horizontal deflection circuit of a television receiver wherein said other end of said inductance element and said other driving electrode of said piezoelectric transformer are connected across electrodes of said switching element.

3. The high voltage generating apparatus according to claim 1 and including means connected to said one end of said inductance element which is connected to said one driving electrode for deriving a voltage lower than the voltage taken out from said output electrode of said piezoelectric transformer.

* * * * *

UNITED STATES PATENT OFFICE

CERTIFICATE OF CORRECTION

Patent No. 3,683,210 Dated August 8, 1972

Inventor(s) Takehiko Kawada

It is certified that error appears in the above-identified patent and that said Letters Patent are hereby corrected as shown below:

column 3, line 59, "a 02 b" should be --a and b--;

column 4, line 1, "$e_{o1}$ and $e_{o1}$" should be --$e_{o1}$ and $e_{o2}$--;

column 4, line 42, "15075 KHZ" should be --15.75 KHz--;

column 4, line 45, "KH2" should be --$KH_z$--.

Signed and sealed this 20th day of February 1973.

(SEAL)
Attest:

EDWARD M.FLETCHER,JR.
Attesting Officer

ROBERT GOTTSCHALK
Commissioner of Patents